UNITED STATES PATENT OFFICE.

AUGUST BERNTHSEN, OF HEIDELBERG, BADEN, ASSIGNOR TO BADISCHE ANILIN AND SODA FABRIK, OF MANNHEIM, GERMANY.

MANUFACTURE OF MATERIALS SUITABLE FOR DYE-STUFFS.

SPECIFICATION forming part of Letters Patent No. 282,835, dated August 7, 1883.

Application filed July 12, 1883. (No specimens.)

*To all whom it may concern:*

Be it known that I, AUGUST BERNTHSEN, a subject of the Grand Duke of Baden, residing at Heidelberg, in the Grand Duchy of Baden and Empire of Germany, have invented new and useful improvements in the manufacture of materials suitable for the preparation of dye-stuffs or coloring-matters containing sulphur as an essential element of their constitution, of which the following is a specification.

This invention relates to the production of thiodiphenylamine—a new sulphureted derivative of diphenylamine capable of being converted into dye-stuffs or coloring-matters.

In carrying out this invention I submit diphenylamine to the action of sulphur in order to effect a substitution of sulphur for hydrogen.

As an example of the manner in which my invention may be carried into effect, I proceed as follows: About ten parts, by weight, of diphenylamine are mixed with about four parts, by weight, of sulphur, and the mixture is heated in a suitable vessel or still provided with proper appliances for safely carrying off the sulphureted hydrogen generated throughout the process. I prefer to maintain the temperature at about from 250° to 300° centigrade during two hours, or until the development of sulphureted hydrogen has ceased, or nearly so. In order to purify the crude thiodiphenylamine thus produced, the same may be submitted to distillation, and the distilled portion may then be further purified by allowing its alcoholic solution to crystallize.

Some of its characteristics are as follows: It is a yellowish-white crystalline solid, soluble in alcohol, ether, benzine, glacial acetic acid, sparingly soluble in petroleum naphtha, and insoluble in water. It readily dissolves in concentrated sulphuric acid. According to the thickness of the layer, light is transmitted through the solution with a color varying from a greenish-black to yellow or pink. The dilute alcoholic solution is colored intensely green on addition of perchloride of iron. Thiodiphenylamine is readily acted upon by nitric acid in the cold, and the nitro-substitution product thus obtained, upon being submitted to the action of reducing agents—such as tin and hydrochloric acid—is converted into a colorless base, which, by oxidation, assumes an intense purple coloration, owing to the production of a dye-stuff, the process for which will be made the subject-matter of a separate application for Letters Patent.

What I claim as new, and desire to secure by Letters Patent, is—

As a new article of manufacture, thiodiphenylamine hereinbefore described and having the characteristics above set forth.

In testimony whereof I have hereunto set my hand in the presence of two subscribing witnesses.

AUGUST BERNTHSEN.

Witnesses:
C. CHAMBERS,
JOHANNES BÜTTNER.